Figure 1:
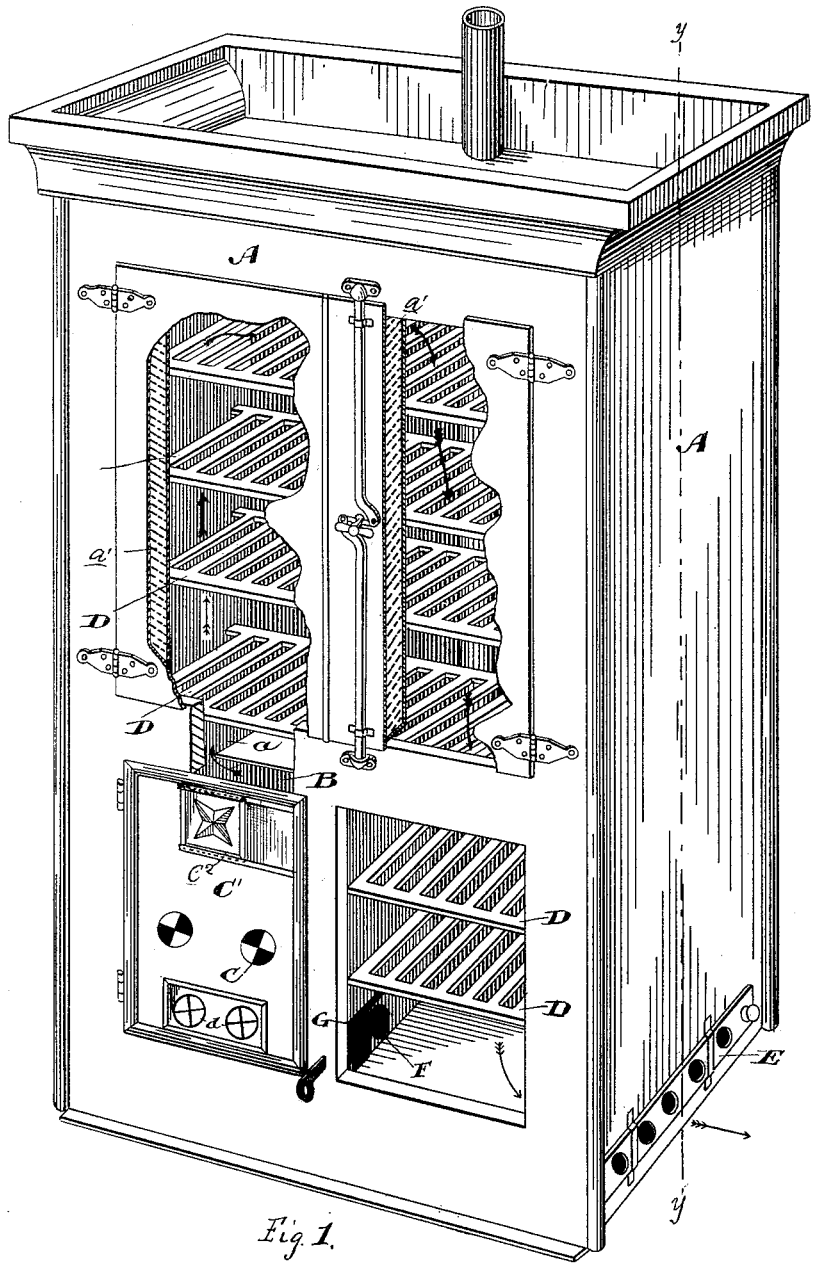

(No Model.) 3 Sheets—Sheet 1.

C. F. HUBBARD.
COOKING OVEN.

No. 406,911. Patented July 16, 1889.

Witnesses.
James E. Mayhee
J. M. Jackson

Inventor.
C. F. Hubbard
by Donald C. Ridout & Co
Attys (No Model.) 3 Sheets—Sheet 2.
C. F. HUBBARD.
COOKING OVEN.
No. 406,911. Patented July 16, 1889.
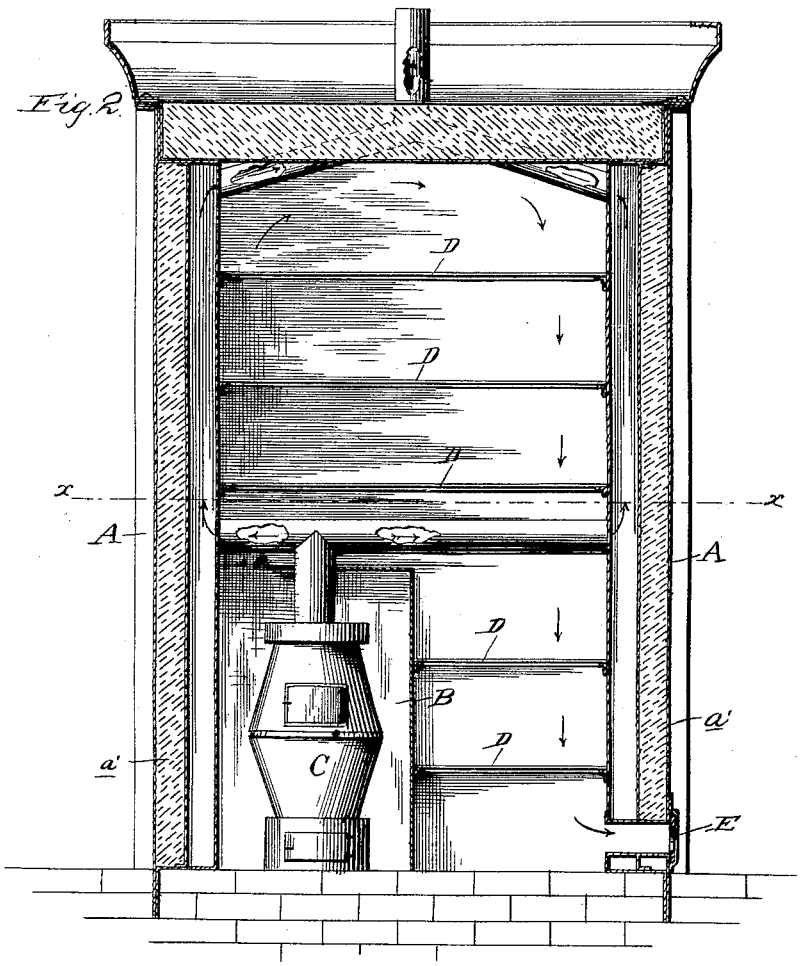
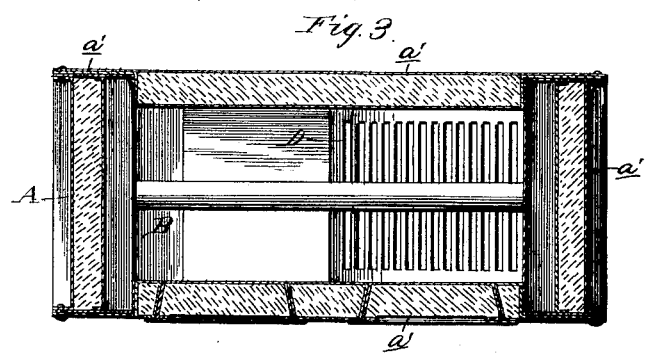
Witnesses.
Inventor.
Chas. F Hubbard
By Donald C Ridout & Co
Attorneys (No Model.) 3 Sheets—Sheet 3.

C. F. HUBBARD.
COOKING OVEN.

No. 406,911. Patented July 16, 1889.

Witnesses.
P. E. Robertson
W. T. Robertson

Inventor:
Chas F Hubbard
By Donald C Ridout &es
Attorneys,

UNITED STATES PATENT OFFICE.

CHARLES F. HUBBARD, OF TORONTO, ONTARIO, CANADA.

COOKING-OVEN.

SPECIFICATION forming part of Letters Patent No. 406,911, dated July 16, 1889.

Application filed November 18, 1886. Renewed January 17, 1889. Serial No. 296,671. (No model.)

*To all whom it may concern:*

Be it known that I, CHARLES FREDERICK HUBBARD, of the city of Toronto, in the county of York, in the Province of Ontario, Canada, have invented certain new and useful Improvements in Cooking-Ovens, of which the following is a specification.

The object of the invention is to arrange a heater within an oven so that a small heater shall be capable of heating a large oven, which oven may also be utilized for the purpose of an ordinary hot-air furnace; and it consists, essentially, of a large case having a compartment located at the side or in the center of its lower portion, and into this compartment an ordinary stove, preferably of approved construction, may be inserted. Fresh air is admitted into the stove-compartment, and is permitted to escape therefrom into the case or oven proper. A series of open shelves are arranged within the case or oven, as indicated in the drawings, and it is divided so that the heated air escaping from the stove-compartment ascends through these open shelves on one side of the oven and thence down through the open shelves on the opposite side of the oven, finally escaping through a flue at the bottom of the oven, where it may be carried to the chimney-flue or permitted to escape into the room, as desired.

Figure 1 represents a perspective view of my oven, a portion of it being broken away to expose its interior. Fig. 2 is a vertical section through the line $y\ y$ of Fig. 1. Fig. 3 is a cross-section on the line $x\ x$ of Fig. 2, and Fig. 4 is a sectional detail in perspective.

Figure 4:
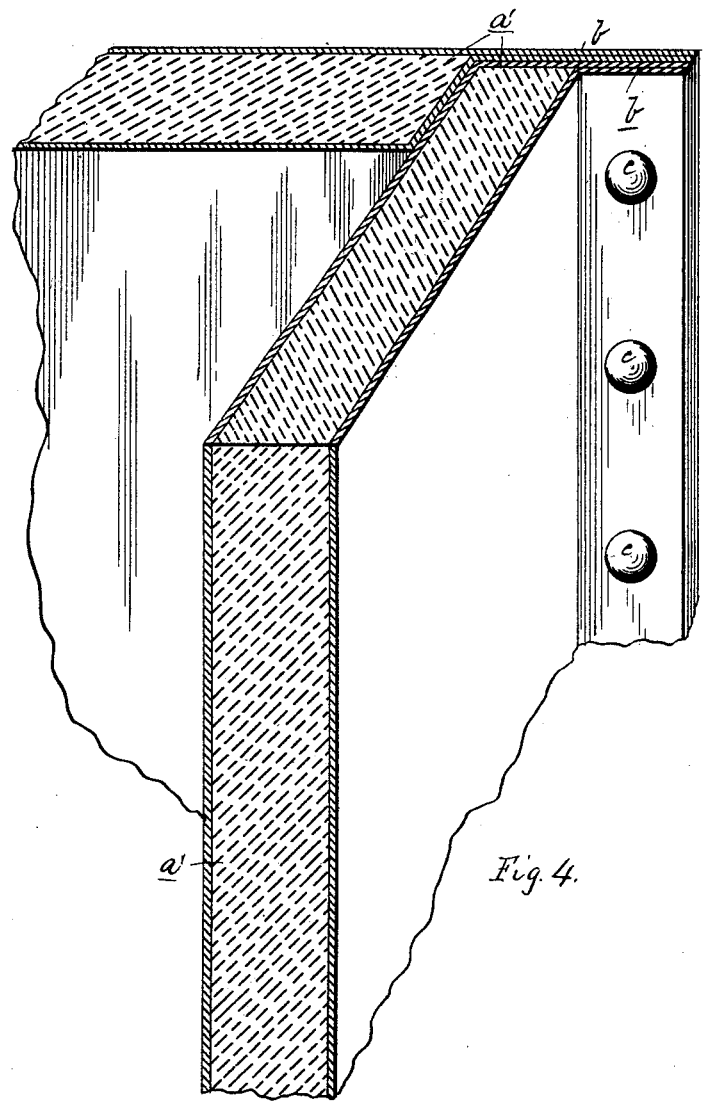

A is a large rectangular case, preferably made in sections provided with flanges, as shown in Fig. 4, so that it can be taken apart and readily shipped, and forming, when put together, my improved oven.

The sections are formed with flanges $b$, formed by the extension of the walls of the sections, and through these flanges are passed the bolts or rivets $c$. By this construction the securing means are entirely outside the oven, where there is no danger of their being affected by the heat. The flange of one section is twice the length of that of the adjoining section, as shown best in Fig. 4, so that one section extends past the end of the other, and thus serve to brace and strengthen each other. The sections are lined with asbestus $a'$, which, being a non-conductor, allows the oven to retain the full benefit of the heat. Within this case I form a compartment designed to receive the stove or heater C. The side and top of the compartment B make it distinct from the case or oven A, except that there is an opening $a$ at the top of one side of the compartment B, through which opening the heated air from the compartment B escapes into the case or oven A and ascends to its top, as indicated by arrows, through the open shelves D, which show that when the heated air reaches the top of the oven it descends down to the opposite side to the compartment B, whence it escapes through openings made near the base of the case or oven A, which openings may be connected by a flue to the chimney or can be covered by an adjustable slide E, as indicated in the drawings. A suitable door $C'$, provided with a proper slide $C^2$, is placed on the compartment B, so that the side of the compartment may be opened up entirely by opening the door, or have a sufficient opening made by means of the slide to admit the necessary fresh air into the compartment to supply the place of that circulating through the case or oven A.

With the view of obtaining a greater heat in the oven, I provide an opening F, communicating with the interior of the ash-pan and designed to be closed by the slide G. In order to direct the heat into the ash-pan and up through the fire, I close the lower dampers $d$, connecting with the ash-pan and the adjustable slide E. It will now be seen that the heated air in the compartment B will pass through the oven, as before described, and when it reaches the floor again passes through the opening F, thence up through the fire, thus greatly increasing the heat of the oven.

From this description it may be seen that the case or oven A is heated not only by radiation from the sides and top of the compartment B, but that air heated in the said compartment is circulated through the case or oven, which circulation of heated air makes the baking propensities of the oven much more perfect. It will also be observed that my oven will make an admirable hot-air furnace.

What I claim as my invention is—

1. The case or oven A, provided with a series of shelves and having an opening near its base, and a stove-compartment B in the lower part of said oven and communicating with the upper part thereof through the opening $a$, and provided with an opening F, affording communication between the stove-compartment and the lower part of the oven, and the slide G, controlling said opening F, the damper $d$, and the slide E, substantially as described.

2. A case or oven formed in sections lined with asbestus, said sections being formed with flanges $b$, and the rivets passed through said flanges outside the oven, substantially as shown and described.

Toronto, September 16, 1886.

CHARLES F. HUBBARD.

In presence of—
F. BARNARD FETHERSTONHAUGH,
J. M. JACKSON.